United States Patent [19]

Ward

[11] 4,271,360

[45] Jun. 2, 1981

[54] INFRA-RED SURVEILLANCE SYSTEMS USING MULTI-FACETED MIRROR

[75] Inventor: Brooke A. Ward, Reading, England

[73] Assignee: Intrusion Microwave Electronics Limited, East Molessey, England

[21] Appl. No.: 972,530

[22] Filed: Dec. 22, 1978

[30] Foreign Application Priority Data

Dec. 22, 1977 [GB] United Kingdom ............... 53426/77

[51] Int. Cl.[3] ........................... G01J 1/00; G02B 5/08

[52] U.S. Cl. .................................... 250/353; 250/338; 350/292; 350/299

[58] Field of Search ............... 250/347, 353, 342, 338; 350/292, 293, 299

[56] References Cited

U.S. PATENT DOCUMENTS

| | | | |
|---|---|---|---|
| 3,886,360 | 5/1975 | Reiss et al. | 250/353 |
| 3,923,382 | 12/1975 | Harding | 350/293 |
| 3,972,598 | 8/1976 | Kunz | 350/293 |

*Primary Examiner*—Alfred E. Smith
*Assistant Examiner*—Carolyn E. Fields
*Attorney, Agent, or Firm*—Louis E. Marn; Elliot M. Olstein

[57] ABSTRACT

An infra-red surveillance system comprising a multi-faceted mirror, the facets of which are inclined relative to one another, and a focussing system for focussing the energy reflected by the facets onto a common detector, the system being such that the area of surveillance is divided into monitored and unmonitored zones, only energy from an object disposed within a monitored zone being directed by a facet of the mirror and the focussing system onto the detector.

5 Claims, 6 Drawing Figures

INFRA-RED SURVEILLANCE SYSTEMS USING MULTI-FACETED MIRROR

The present invention relates to infra-red surveillance systems.

The advent of inexpensive pyroelectric radiant energy detectors has increased the feasibility of an infra-red surveillance system for detection of intruders or fire within an area of surveillance. A pyroelectric detector responds to a change in its temperature caused by absorption of intermittent incident radiant energy. The detector response is in the form of a change in the electronic charge on the surface of the pyroelectric crystal, this charge decaying with time. The detector is therefore responsive only to changes in temperature and not merely to the presence of an energy source.

When using such a detector as an intrusion sensor, it is not satisfactory only to form a radiant image of the area of surveillance on the surface of the detector. In such a case, the movement of an intruder would only cause his image to move over the surface of the detector element and this would not cause a reliable signal.

In order to produce a suitable signal, it has already been proposed to modulate the radiant energy signal by resort to one of the following methods:

1. Causing the image to move over a masking grid pattern before incidence on the detector element, 2. Causing the intruder's image to move over an array of detector elements, and 3. by dividing the protected area into monitored and unmonitored zones, radiation from all monitored zones being focussed onto a common detector element.

In all these methods, any given detector will only receive radiation from objects within discrete zones and as an object moves between these zones it will induce a temperature change in the detector providing that its emissivity differs from that of the background. Fire or turbulent smoke appearing within an area of surveillance will elicit the same response from a detector.

The present invention seeks to provide a system which is capable of wide angles of coverage simultaneously in a horizontal and vertical plane. According to the present invention, there is provided an infra-red surveillance system which comprises a multi-faceted mirror, the facets of which are inclined relative to one another, and a focussing system for focussing the energy reflected by the facets onto a common detector, the system being such that the area of surveillance is divided into monitored and unmonitored zones, only energy from an object disposed within a monitored zone being directed by a facet of the mirror and the focussing system onto the detector.

Preferably, the planes of the facets are so inclined that a parallel bundle of beams is produced from the energy reflected from the monitored areas, the focussing system being comprised of a telescope system for focussing the parallel bundle of beams onto the common detector. Conveniently, the telescope system is designed such that the maximum angle of incidence of the radiation does not exceed the maximum angle of acceptance of the detector.

The telescope may conveniently consist of a single paraboloid mirror but may alternatively comprise a telescope system having a plurality of reflectors such as a Shmidt, Cassegrain, or Bowers-Maksutov system.

The multi-faceted mirror may conveniently consist of a plurality of rings of facets, the facets within each ring being inclined at the same angle to the vertical, this angle being different from the angle of facets in the remaining rings. In this manner, each ring offers surveillance over 360° at a predetermined range from the mirror. It is important to ensure that the projected area of the facets serving each monitored zone is great enough to collect sufficient radiation from a typical target at the maximum design range to exceed the minimum detection limit of the pyroelectric detector and the associated electronic circuitry.

The invention will now be described further, by way of example, with reference to the accompanying drawings, in which.

Figure 1:
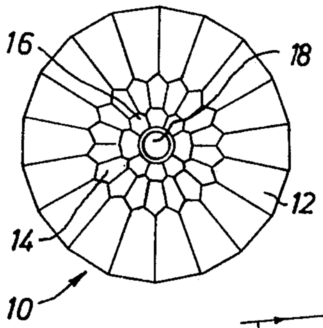
FIG. 1 is a plan view looking up at a multi-faceted mirror.
Figure 2:
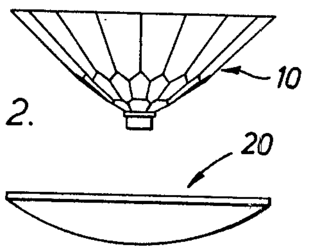
FIG. 2 is a side elevation of a monitoring system including the multi-faceted mirror of FIG. 1, FIG. 3 schematically shows the path of rays incident upon the mirror in FIG. 2.
Figure 3:
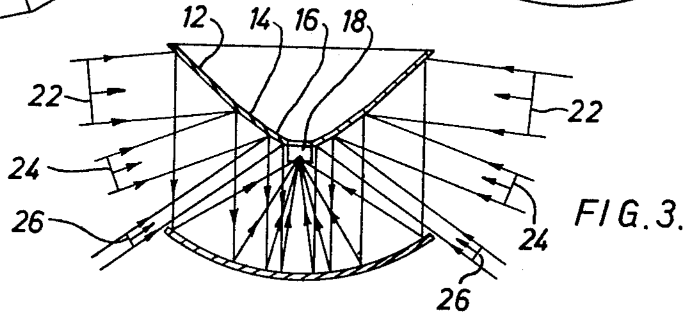
Figure 4:
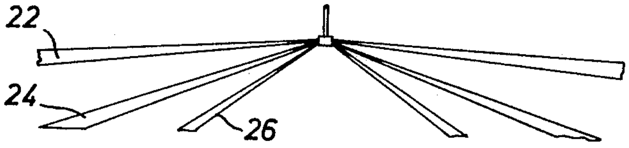
FIG. 4 shows in vertical section the directional sensitivity pattern of the system shown in FIG. 2.
Figure 5:
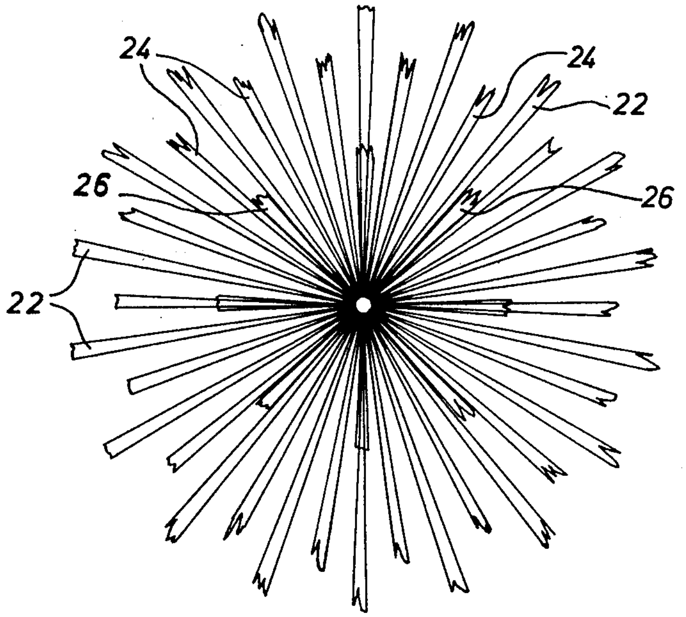
FIG. 5 shows the directional sensitivity pattern of the system in FIG. 2 in a plan view.

In FIGS. 1 and 2 there is shown a multifaceted mirror generally designated 10 which comprises an outer ring of facets 12, an intermediate ring of facets 14 and an inner ring of facets 16. At the centre of the multi-faceted mirror is a detector 18. The multi-faceted mirror 10 is positioned vertically above a parabolic reflector 20. Referring now to FIGS. 3, 4 and 5, parallel beams 22 from distant monitored zones are reflected by the facets 12 and the parabolic reflector 20 onto the detector 18. From intermediate zones, the parallel beams 24 are reflected by the facet 14 and from the zones nearest the surveillance system the beams 26 are reflected by the facet 16. The beams reflected by all three sets of facets emerge from the multi-faceted mirror as a parallel beam and are focussed by the parabolic reflector 20 onto the detector 18. It is alternatively possible to replace the parabolic reflector 20 by any suitable telescope system.

The area of surveillance is therefore divided into a plurality of monitored and unmonitored zones and as a source of energy moves within the area of surveillance its image will be periodically received and non received at the detector and consequently the detector will generate a signal indicative of the presence of an intruder. The presence of a flame provides a flickering image which will also result in changes in the temperature of the detector to produce an alarm signal.

It will be noted that the area of the facet 16 is small whereas the facets 12 have a considerably larger area. The reason for this is that as the object becomes more distant it is necessary to provide an increased aperture in order for sufficient energy to be received by the detector to respond to a charge caused by movement of the object.

Figure 6:
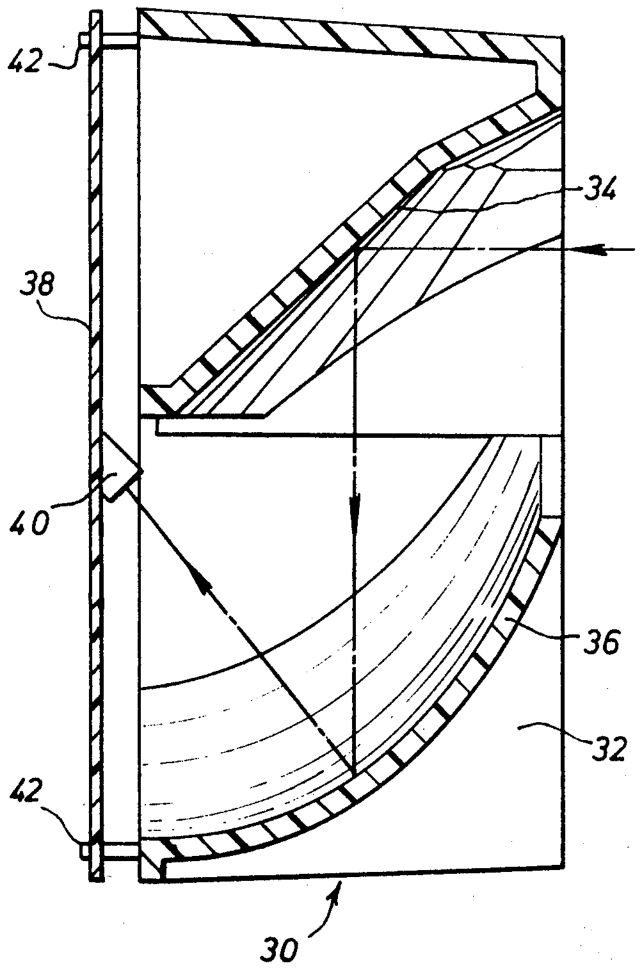
FIG. 6 is a schematic representation in section of a further embodiment of the invention.

In FIG. 6, there is shown an alternative embodiment of the invention in which the optical system of an infra-red surveillance system is moulded integrally in one piece and may readily be mounted directly onto a circuit board supporting the infra-red detector and any other circuitry. A generally rectangular box 30 is open to the front and the rear and has extending between its two longer side walls 32 two reflector 34 and 36. The reflector 34 is multi-facted whilst the reflector 36 is parabolic and arranged beneath the multi-faceted reflector 34. The system in this embodiment only surveys an angle of 180° or less and may conveniently be mounted on a wall. The parabolic reflector 36 reflects light from the multi-facted reflector 34 onto a detector 40 which is arranged at an angle on a circuit board 38 closing one face of the rectangular box 30 and carrying at least part of the electrical circuitry of the apparatus. In this embodiment, the open box 30 incorporating the reflectors 34 and 36 may conveniently be moulded in one piece from a plastics material, a mirror coating being subsequently applied to the surfaces of the reflectors 34 and 36. The optics may therefore be manufactured cheaply and the mounting of the optical system on the circuit board may be effected simply. Studs 42 are formed on the box to register in holes in the circuit board 38 to ensure automatic alignment of the detector 40 which occupies a predetermined position on the circuit board 38 with the focus of the optical system.

I claim:

1. An infrared surveillance system which comprises:

a main body integrally formed of a plastic material and having side walls, said main body including an infrared radiation receiving member and a focusing member disposed in spaced relationship between said side walls, said infrared radiation receiving member being formed of a plurality of mirrored facets, each of said mirrored facets being angularly disposed to thereby define an area of surveillance divided into monitored zones and unmonitored zones, said facets being of varying area whereby facets of larger areas provide an increased aperture to be responsive to movement of more distant objects, said focusing member being disposed to receive reflected infrared radiation from said infrared radiation receiving member and to focus such received reflected infrared radiation.

2. The infrared surveillance system as defined in claim 1 wherein said mirrored facets are formed in a plurality of arrays, each of said arrays being disposed in a plane spaced apart from a plane of an adjacent array.

3. The infrared surveillance system as defined in claim 2 wherein said focusing member is a paraboloid mirror.

4. The infrared surveillance system as defined in claim 3 and further including a circuit board having a common detector for mounting said main body at a predetermined position to locate said common detector relative to said focussed infrared radiation.

5. The infrared surveillance system as defined in claim 4 wherein said arrays define an angle of less than 180°.

* * * * *